United States Patent [19]

Ho et al.

[11] Patent Number: 5,545,004

[45] Date of Patent: Aug. 13, 1996

[54] GAS TURBINE ENGINE WITH HOT GAS RECIRCULATION POCKET

[75] Inventors: Kuo-San Ho; William J. Howe, both of Chandler; Jeffrey E. May, Phoenix, all of Ariz.

[73] Assignee: AlliedSignal Inc., Morris Township, N.J.

[21] Appl. No.: 363,157

[22] Filed: Dec. 23, 1994

[51] Int. Cl.⁶ .................................... F01D 11/02
[52] U.S. Cl. ............................. 415/115; 415/116
[58] Field of Search .................... 415/115, 116

[56] References Cited

U.S. PATENT DOCUMENTS

| | | |
|---|---|---|
| 2,598,176 | 5/1952 | Johnstone . |
| 3,318,573 | 5/1967 | Matsuki et al. . |
| 3,321,179 | 5/1967 | Johnson et al. . |
| 3,609,057 | 9/1971 | Redtke . |
| 4,103,899 | 8/1978 | Turner . |
| 4,177,004 | 12/1979 | Riedmiller et al. . |
| 4,582,467 | 4/1986 | Kisling . |
| 5,211,533 | 5/1993 | Walker et al. . |
| 5,215,435 | 6/1993 | Webb et al. . |
| 5,252,026 | 10/1993 | Shepherd . |

Primary Examiner—John T. Kwon
Attorney, Agent, or Firm—James W. McFarland

[57] ABSTRACT

A hot gas recirculation pocket is provided in a gas turbine engine to capture hot gas ingested from an annular hot gas flow path into an internal cooled engine cavity, and to recirculate the ingested hot gas to the hot gas flow path. The engine includes rows of stator vanes and rotor blades mounted in an axially alternating sequence along the hot gas flow path, wherein the rotor blades are peripherally supported by rotor disks disposed within the cooled engine cavity and coupled to a main engine shaft. The recirculation pocket is defined by a contoured shroud mounted within the cooled engine cavity to form a radially outwardly open toroidal-shaped pocket for capturing and recirculating any hot gas ingested through the space between adjacent rows of stator vanes and rotor blades.

17 Claims, 1 Drawing Sheet

GAS TURBINE ENGINE WITH HOT GAS RECIRCULATION POCKET

BACKGROUND OF THE INVENTION

This invention relates generally to improvements in gas turbine engines, particularly with respect to improved thermal isolation of engine components from high temperature mainstream combustor gases. More specifically, this invention relates to an improved and effective recirculation pocket for capturing and recirculating any hot gas ingested from a main hot gas flow path into an internally cooled engine cavity, and for recirculating the ingested hot gas to the main flow path.

Gas turbine engines are generally known in the art for use in a wide range of applications such as aircraft engines, auxiliary power units for aircraft, etc. In a typical configuration, the gas turbine engine includes a plurality of sets or rows of stator vanes and rotor blades disposed in an alternating sequence along the axial length of a hot gas flow path of generally annular shape. The rotor blades are mounted at the periphery of one or more rotor disks which are coupled in turn to a main engine shaft. Hot combustion gases are delivered from an engine combustor to the annular hot gas flow path, resulting in rotary driving of the rotor disks to provide an engine output.

In most gas turbine engine applications, it is desirable to regulate the normal operating temperature of certain engine components in order to prevent overheating and potential mechanical failures attributable thereto. That is, while the engine stator vanes and rotor blades are specially designed to function in the high temperature environment of the mainstream hot gas flow path, other engine components such as the rotor disks are not designed to withstand such high temperatures. Accordingly, in many gas turbine engines, the volumetric space disposed radially inwardly or internally from the hot gas flow path, comprises an internal engine cavity through which a cooling air flow is provided. The cooling air flow is normally obtained as a bleed flow from a compressor or compressor stage forming a portion of the gas turbine engine. The thus-cooled internal engine cavity results in maintaining the normal steady state temperature of the rotor disks and other internal engine components at or below a selected temperature.

In the past, relatively high cooling air flows have been required to obtain satisfactory temperature control of engine components within the cooled internal engine cavity. The demand for cooling air has been significantly impacted by the leakage of cooling air from the internal cavity and through the space between adjacent rows of stator vanes and rotor blades, into the hot gas flow path. In addition, the demand for cooling flow has been affected by a somewhat irregular and unpredictable ingestion of mainstream hot gases from the hot gas flow path into the internal engine cavity. Various attempts to prevent flow between adjacent stator vanes and rotor blades have primarily involved the use of overlapping lip-type structures in close running clearance, often referred to as flow discouragers, but these structures have not been satisfactorily effective in preventing hot gas ingestion.

A variety of alternative baffle-type structures and techniques have been proposed, in addition to traditional flow discouragers, in efforts to minimize hot gas ingestion into the internally cooled cavity of a gas turbine engine. Such alternative approaches have included pockets of complex shape, some of which receive separate flows of cooling gas, to prevent hot gas ingestion. In the past, these techniques have been generally ineffective, or have otherwise required structures of complex shape and/or complex mounting arrangements at the time of initial engine production.

The present invention effectively overcomes the problems and disadvantages encountered in the prior art by providing an improved hot gas recirculation pocket in a gas turbine engine to reduce or eliminate hot gas ingestion, wherein the recirculation pocket captures and recirculates ingested hot gas with high efficiency, while additionally being adapted for quick and easy installation during engine production.

SUMMARY OF THE INVENTION

In accordance with the invention, a gas turbine engine is provided with a hot gas recirculation pocket for improved thermal isolation of engine components disposed within an internal cooled engine cavity from hot mainstream gases flowing through an engine hot gas flow path of generally annular shape. The recirculation pocket is defined by a contoured shroud adapted for quick and easy installation at the time of initial engine production, wherein the contoured shroud captures ingested hot gases for effective recirculation into the main hot gas flow path of the engine.

The gas turbine engine includes circumferentially arranged sets of stator vanes and rotor blades disposed in alternating sequence in axially spaced relation along the annular hot gas flow path. The stator vanes are suitably secured to a generally cylindrical duct wall or the like defining the internal cooled engine cavity, and an inboard surface of the hot gas flow path. The rotor blades are mounted at the periphery of one or more rotor disks which are coupled in turn to a main engine shaft. A supply of cooling gas in the form of a bleed flow from an engine compressor stage or the like is circulated into the internal engine cavity for cooling engine components therein, particularly the rotor disks having the rotor blades mounted thereon.

In the preferred form of the invention, at least one contoured shroud defining a toroidal-shaped hot gas recirculation pocket is mounted within the internal engine cavity at the upstream or high temperature side of a rotor disk. A single recirculation pocket may be provided in association with the rotor disk disposed closest to the engine combustor and thus subjected to highest temperature. Alternately, recirculation pockets may be mounted at the upstream or high temperature side of more than one rotor disk, or on opposite axial sides of one or more rotor disks.

The contoured shroud defining the recirculation pocket includes a radially extending base wall adapted for mounting at the inboard side of the duct wall separating the hot gas flow path from the internal cooled engine cavity. The base wall extends radially inwardly from the duct wall, and then turns axially to define an inboard wall extending toward the adjacent rotor disk. The inboard wall is joined in turn to a radially outwardly extending end wall disposed in relatively close running clearance relation with a adjacent rotor disk, and terminating in a free edge disposed in axial alignment and/or overlapping relation with the rotor blade platform on the rotor disk. In one embodiment, the base wall and inboard wall of the contoured shroud are provided as a common element for suitable attachment by rivet means or the like to the engine duct wall, with the end wall being adapted for connection thereto by additional rivet means. In another form, the inboard and end walls are provided as a unitary element adapted for suitable connection by rivet means to the base wall.

In operation, the contoured shroud cooperates with the duct wall and/or associated platform of the stator vanes to form a narrow area throat located substantially at the space between adjacent rows of stator vanes and rotor blades. Any hot gas drawn or ingested by fluctuating pressure differentials into the internal engine cavity will flow directly into the circumferential recirculation pocket. Within the recirculation pocket, the velocity of the ingested hot gas is substantially reduced and/or such gas tends to flow circumferentially through the pocket to a lower pressure region for appropriate recirculation back through the pocket throat and into the mainstream hot gas flow path of the engine.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
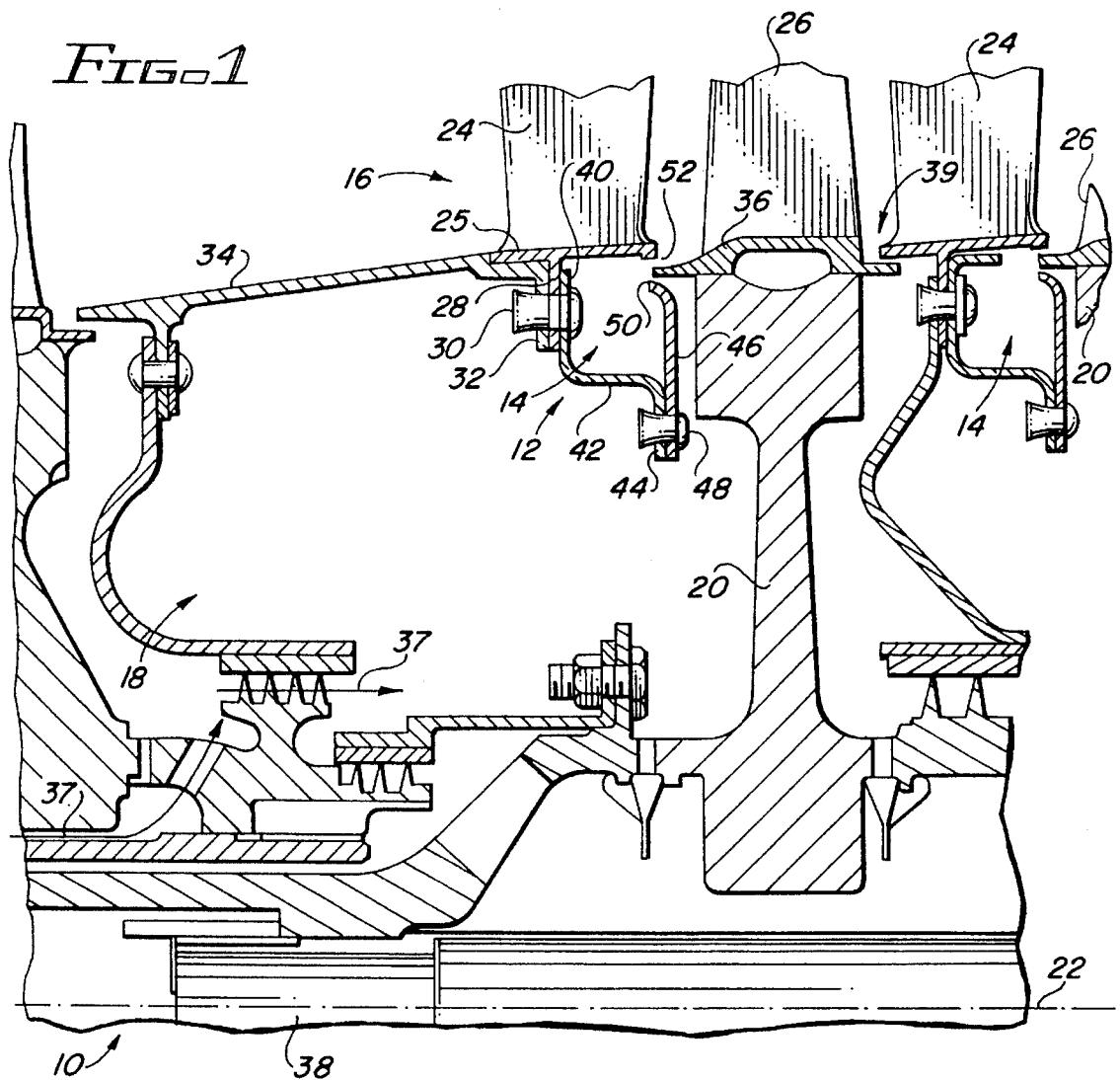
FIG. 1 is a fragmented vertical sectional view illustrating a portion of a gas turbine engine having a hot gas recirculation pocket formed in accordance with the invention.

As shown in the exemplary drawings, a gas turbine engine referred to generally in FIG. 1 by the reference numeral 10 includes a contoured shroud 12 defining a hot gas recirculation pocket 14 for capturing and recirculating hot gas ingested from a mainstream hot gas flow path 16 of the engine. The recirculation pocket 14 effectively minimizes or prevents undesirable high temperature exposure of engine components mounted within an internal cooled engine cavity 18, particularly such as a turbine rotor disk 20 of a turbine rotor.

The gas turbine engine 10 has an overall construction and operation which is generally known to and understood by persons skilled in the art. In general terms, hot combustion gases flow from an engine combustor (not shown) to the hot gas flow path 16 defined by engine housing members to have a generally annular shape formed about a central engine shaft axis 22. These mainstream heated engine gases flow past axially spaced circumferential rows of stator vanes 24 and rotor blades 26 formed from suitable turbine blade materials capable of withstanding the high temperature environment within the hot gas flow path 16. As shown, the stator vanes 24 project radially outwardly from a circumferential platform 25, with a connector flange 28 extending radially inwardly therefrom for convenient assembly by rivets 30 or the like to a mounting ring 32 forming a portion of an annular duct wall 34 which separates the outer hot gas flow path 16 from the internal cooled cavity 18.

The rotor blades 26 project radially outwardly from a similar circumferential platform 36 which is adapted for appropriate connection to the rotor disk 20 at the periphery thereof. The rotor disk 20 is generally positioned within the internal engine cavity 18 and is appropriately coupled to a main engine shaft 38 for rotation therewith. As is known in the art, multiple rows of the stator vanes 24 and the rotor blades 26 may be provided in the gas turbine engine, with the rotor blades 26 and associated rotor disk 20 being rotatably driven by the hot gas flowing through the hot gas flow path 16. Each row of the rotor blades 26 projects into the hot gas flow path 16 through an annular space 39 in the duct wall 34 formed between adjacent rows of the stator vanes 24, with the rotor blade platform 36 being positioned within said space 39 at the inboard side of the flow path 16. A supply of cooling air obtained typically as a bleed flow for an engine compressor or compressor stage (not shown) is circulated into the cavity 18 as indicated by arrow 37 to cool engine components therein.

FIG. 1 shows a pair of turbine rotor disks 20 having rotor blades 26 thereon, wherein each rotor disk 20 is associated with a hot gas recirculation pocket 14 at the upstream or high temperature side thereof. In this regard, it will be understood that one or more hot gas recirculation pockets 14 in accordance with the invention may be provided at strategic locations for preventing hot gas ingestion from the outer hot gas flow path 16 into the internal cooled cavity 18. In a typical application, a recirculation pocket 14 will be positioned at the high temperature side of the turbine rotor disk 20 disposed closest to the engine combustor, and thus subjected to the highest temperature gas. Multiple recirculation pockets 14 may be provided, for example, at the high temperature side of more than one rotor disk, or on opposite sides of one or more rotor disks.

As shown in FIG. 1, in the preferred form, the contoured shroud 12 defining the recirculation pocket 14 is constructed from a pair of lightweight and easily assembled wall members of stamped sheet metal or the like. A first such member defines a base wall 40 adapted for secure attachment to the duct wall 34 by means of the rivets 30, at the time of stator vane installation. The base wall 40 projects radially inwardly at an axial position spaced upstream from the leading edge of the blade platform 36 associated with the adjacent rotor blades 26. The base wall 40 is formed integrally with an inboard wall 42 which protrudes axially toward the adjacent rotor disk 20, terminating in a radially inwardly turned mounting flange 44. The second wall member comprises an end wall 46 which overlies the mounting flange 44 and is adapted for convenient assembly therewith by means of additional rivets 48 or the like. From this riveted connection, the end wall 46 extends radially outwardly in substantially parallel, close running clearance with the adjacent rotor disk 20, and terminates in a free edge 50 which closely underlies the upstream edge of the blade platform 36. In the most preferred form of the invention, the end wall 46 is axially positioned with axial overlap relative to the blade platform 36, and the free edge 50 is defined by a curved lip extending a short distance back toward the base wall 40. However, the free edge 50 does not protrude, axially beyond the upstream edge of the blade platform 36.

The various walls 40, 42 and 46 defining the contoured shroud 12 cooperate with the duct wall 34 and/or stator vane platform 25 to define the recirculation pocket 14 of annular or toroidal-shape extending around the circumference of the internal cavity 18 in close proximity to the space between adjacent rows of stator vanes 24 and rotor blades 26. A narrow throat 52 for the pocket 14 is defined to accommodate the requisite running clearance between these components. In a typical engine, the radial dimension of this throat is on the order of 0.04 inch.

In operation, pressure gradients which may occur along the hot gas flow path 16 can contribute to a somewhat unpredictable tendency for hot gas to be ingested from the path 16 into the internal cooled engine cavity 18. With the present invention, such ingested hot gas flows directly through throat 52 into the circumferential recirculation pocket 14 wherein the velocity thereof is reduced to substantially prevent further travel past the pocket 14, into the cavity 18. Instead, the hot gas is captured within the recirculation pocket 14 where it tends to migrate circumferentially through the pocket to a region of lower pressure, for corresponding recirculation back to the hot gas flow path 16. In this regard, the assembled shroud 12 is formed by the wall members to omit any perforation therein though which ingested hot gas could otherwise leak into the cavity 18. Instead, ingested hot gas is substantially isolated from the cavity 18 and the engine components therein, to achieve substantially improved overall temperature control.

While the dimensions of the recirculation pocket 14 can vary in accordance with engine size and operating temperatures, it is preferred that the radial depth of the pocket 14 be equal to or greater than the axial pocket dimension. In a most preferred form of the invention, the axial pocket dimension is on the order of five times the radial dimension of the throat 52, and the radial pocket dimension is on the order of ten times the throat dimension.

Figure 2:
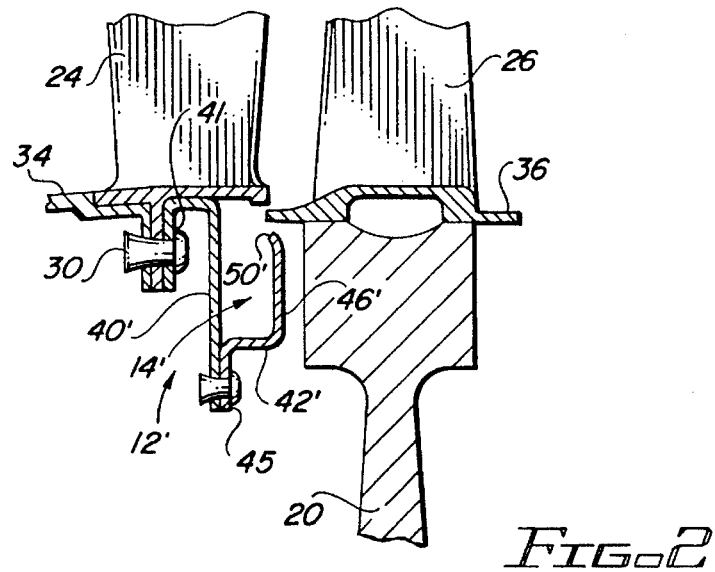
FIG. 2 is a fragmented vertical sectional view corresponding generally to a portion of FIG. 1, and illustrating a modified recirculation pocket geometry.

FIG. 2 illustrates an alternative preferred form of the invention, wherein a modified contoured shroud 12' defines a hot gas recirculation pocket 14'. In this regard components shown in FIG. 2, and corresponding functionally with but otherwise modified from those shown in FIG. 1, are identified by common primed reference numerals. As shown, the base wall 40' includes a downturned mounting flange 41 for connection by means of the rivets 30 or the like to the duct wall 34. The base wall 40' extends radially inwardly from the stator vanes 24, terminating in a mounting flange adapted for connection to a mated mounting flange 45 on the inboard wall 42'. In this version, the inboard wall 42' is formed integrally with the end wall 46' which in turn defines the free edge 50' in close proximity to the blade platform 36. In operation, this modified form of the invention functions in the same manner, as previously described with respect to FIG. 1.

A variety of further modifications and improvements to the invention described herein will be apparent to those skilled in the art. Accordingly, if no limitation to the invention is intended by way of the foregoing description and accompanying drawings, except as set forth in the appended claims.

What is claimed is:

1. A gas turbine engine, comprising:

housing means defining a generally annular and axially elongated hot gas flow path for passage of combustion gas, said hot gas flow path being formed radially about and separated by a duct wall having an annular space formed therein;

turbine rotor means including a rotor disk rotatably supported within said internal engine cavity with a periphery of said rotor disk disposed generally within the annular space formed in said duct wall, and a plurality of rotor blades on said disk periphery and disposed generally within said hot gas flow path, said turbine rotor means and said housing means cooperatively defining a narrow clearance throat therebetween on one side of said turbine rotor means; and a contoured shroud mounted within said internal engine cavity in close running clearance with said rotor disk at said disk periphery, said shroud defining a radially outwardly open and circumferentially extending hot gas recirculation pocket for receiving hot gas ingested said hot gas flow path through said clearance throat and for recirculating the ingested hot gas back through said clearance throat to said hot gas flow path, said pocket having an axial dimension and a radial dimension substantially greater than the dimension of said clearance throat, said contoured shroud comprising a base wall extending radially inwardly from said duct wall, an inboard wall extending from said base wall in an axial direction toward said rotor disk, and an end wall extending from said inboard wall in a radially outward direction and in close running clearance with said rotor disk, said end wall terminating in a circumferentially extending free edge disposed in close proximity to said clearance throat, whereby said recirculation pocket substantially directly receives hot gas ingested through said clearance throat for recirculation back through said clearance throat to said hot gas flow path.

2. The gas turbine engine of claim 1 wherein said internal engine cavity is provided with a cooling air flow.

3. The gas turbine engine of claim 1 further including means for supplying a cooling air flow to said internal engine cavity.

4. The gas turbine engine of claim 1 wherein said turbine rotor means has an upstream side and a downstream side relative to the direction of flow of the combustion gas through said hot gas flow path, said contoured shroud being positioned at said upstream side of said turbine rotor means.

5. The gas turbine engine of claim 1 wherein said housing means further includes at least one circumferentially extending row of stator vanes carried within the hot gas flow path, in axially spaced relation with said rotor blades.

6. The gas turbine engine of claim 1 wherein said turbine rotor means further includes a generally annular blade platform at the periphery of said rotor disk, said turbine blades projecting radially outwardly from said blade platform, said clearance throat being defined between said housing means and said blade platform, said free edge of said end wall being axially aligned with an axial edge of said blade platform.

7. The gas turbine engine of claim 1 wherein said turbine rotor means further includes a generally annular blade platform at the periphery of said rotor disk, said turbine blades projecting radially outwardly from said blade platform, said clearance throat being defined between said housing means and said blade platform, said free edge of said end wall being axially overlapped with an axial edge on said blade platform.

8. The gas turbine engine of claim 1 wherein said base wall and said inboard wall comprise a unitary first wall segment for connection to said housing means, and wherein said end wall comprises a second wall segment for connection to said inboard wall.

9. The gas turbine engine of claim 8 wherein said inboard wall includes a downstream mounting flange thereon for connection to said end wall.

10. The gas turbine engine of claim 1 wherein said base wall comprises a first wall segment for connection to said housing means, and wherein said inboard wall and said end wall comprise a second wall segment for connection of said inboard wall to said base wall.

11. The gas turbine engine of claim 1 wherein said base, inboard and end walls are unperforated.

12. The gas turbine engine of claim 1 wherein said free edge of said end wall is curved axially away from said turbine disk.

13. The gas turbine engine of claim 1 wherein said radial dimension of said pocket is substantially greater then said axial dimension of said pocket.

14. The gas turbine engine of claim 13 wherein said axial dimension of said pocket is at least about fives time the dimension of said clearance throat, and further wherein said radial dimension of said pocket is at least about ten times the dimension of said clearance throat.

15. A gas turbine engine, comprising:

housing means defining a generally annular and axially elongated hot gas flow path for passage of combustion gas, said hot gas flow path being formed radially about and separated by a duct wall from an internal engine cavity, said duct wall having an annular space formed therein;

a circumferentially extending row of stator vanes carried by said housing means within the hot gas flow path at a position generally at the upstream said of said annular space in the duct wall relative to the direction of combustion gas flow through said hot gas flow path;

turbine rotor means including a rotor disk rotatably supported within said internal engine cavity with a periphery of said rotor disk disposed generally within the annular space formed in said duct wall, and a plurality of rotor blades on said disk periphery and disposed generally within said hot gas flow path, said turbine rotor means and said stator vanes cooperatively defining a narrow clearance throat therebetween at the upstream side of said turbine rotor means relative to the direction of combustion gas flow; and a contoured shroud mounted within said internal engine cavity in close running clearance with said rotor disk at said disk periphery, said shroud defining a radially outwardly open and circumferentially extending hot gas recirculation pocket for receiving hot gas ingested from said hot gas flow path through said clearance throat and for recirculating the ingested hot gas back through said clearance throat to said hot gas flow path, said pocket having an axial dimension and a radial dimension substantially greater than the dimension of said clearance throat, said contoured shroud defining an unperforated structure for substantially isolating ingested hot gas from said internal engine cavity, said contoured shroud comprising a base wall extending radially inwardly from said duct wall, an inboard wall extending from said base wall in an axial direction toward said rotor disk, and an end wall extending from said inboard wall in a radially outward direction and in close running clearance with said rotor disk, said end wall terminating in a circumferentially extending free edge disposed in close proximity to said clearance throat, whereby said recirculation pocket substantially directly receives hot gas ingested through said clearance throat for recirculation back through said clearance throat to said hot gas flow path.

16. The gas turbine engine of claim 15 wherein said internal engine cavity is provided with a cooling air flow.

17. The gas turbine engine of claim 15 wherein said turbine rotor means further includes a generally annular blade platform at the periphery of said rotor disk, said turbine blades projecting radially outwardly from said blade platform, said clearance throat being defined between said housing means and said blade platform, said free edge of said end wall being axially aligned with an axial edge of said blade platform.

\* \* \* \* \*